United States Patent
Hirade

(10) Patent No.: US 11,162,975 B1
(45) Date of Patent: Nov. 2, 2021

(54) SURFACE ANALYZER

(71) Applicant: Shimadzu Corporation, Kyoto (JP)

(72) Inventor: Masato Hirade, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 17/156,976

(22) Filed: Jan. 25, 2021

(30) Foreign Application Priority Data

May 27, 2020 (JP) .............................. JP2020-092131

(51) Int. Cl.
*G01Q 30/00* (2010.01)
*G01Q 30/20* (2010.01)

(52) U.S. Cl.
CPC .................................... *G01Q 30/20* (2013.01)

(58) Field of Classification Search
CPC ..................................................... G01Q 30/20
USPC ................ 250/440.11, 441.11, 442.11, 443.1
See application file for complete search history.

(56) References Cited

U.S. PATENT DOCUMENTS

| | | | | |
|---|---|---|---|---|
| 4,537,082 A | * | 8/1985 | Meline | G01N 3/06 33/787 |
| 5,656,769 A | * | 8/1997 | Nakano | G01Q 10/04 310/328 |
| 2015/0287179 A1 | * | 10/2015 | Nomaru | G01B 11/306 382/149 |

FOREIGN PATENT DOCUMENTS

JP 6631674 B1 1/2020

* cited by examiner

*Primary Examiner* — Nicole M Ippolito
(74) *Attorney, Agent, or Firm* — Muir Patent Law, PLLC

(57) ABSTRACT

Provided is a conversion mechanism that can be applied to a surface analyzer, etc., the mechanism being capable of smoothly converting a movement direction using a ling mechanism. The moving mechanism is composed of: a link mechanism including a first block, a second block, and a link member pivotally supported by the first block and the second block; a slide mechanism configured to reciprocate the first block in a first direction; and a contact member configured to come into contact with the second block or link member to guide a lifting and lowering movement of the second block in a second direction. The link member is pivotally supported by the first block and the second block so that it can be pivoted about a rotation axis in the third direction perpendicular to the first direction and the second direction. The contact member has a circular cross-section when viewed from the third direction. When the first block moves toward the contact member, the second block or the link member initially comes into contact with the contact member at a first contact point positioned obliquely above a central axis of the circular cross-section.

12 Claims, 9 Drawing Sheets

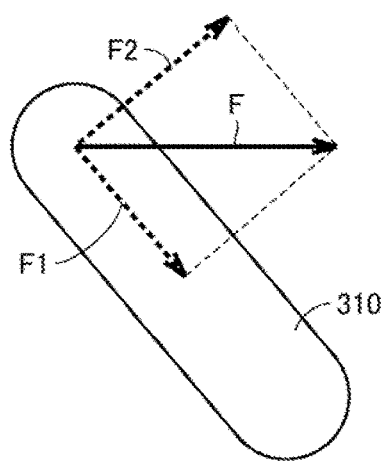
FIG. 6
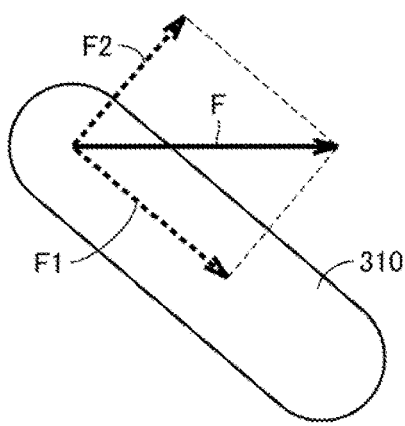
FIG. 7
FIG. 8
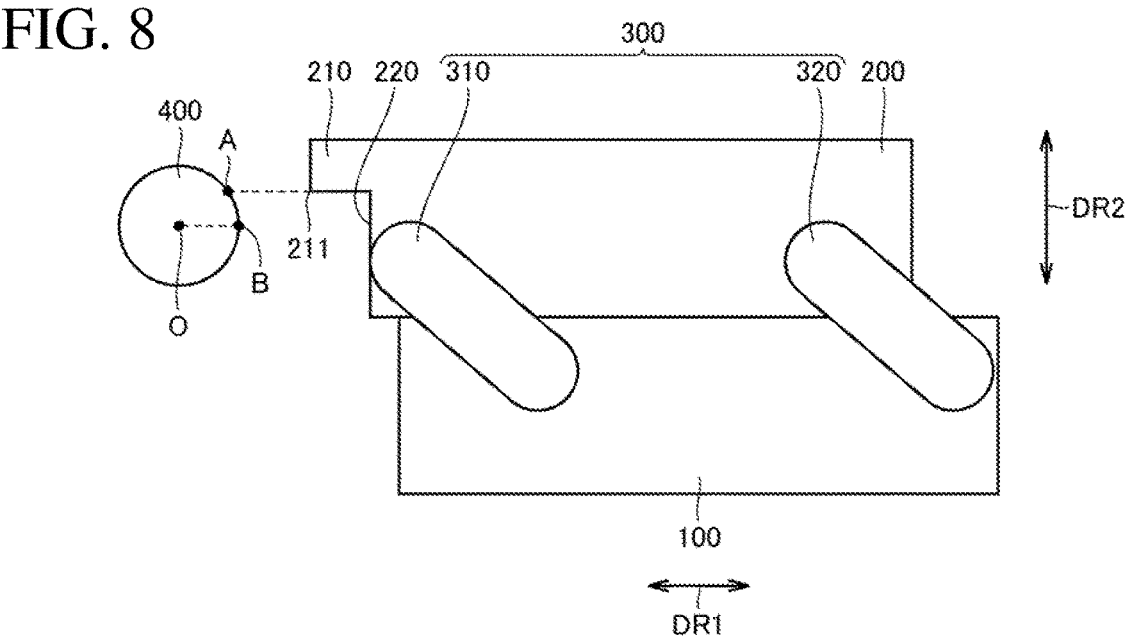

SURFACE ANALYZER

CROSS-REFERENCE TO RELATED APPLICATIONS

This application claims priority under 35 U.S.C. § 119 to Japanese Patent Application No. 2020-092131 filed on May 27, 2020, the entire disclosure of which is incorporated herein by reference in its entirety.

TECHNICAL FIELD

The present disclosure relates to a surface analyzer which is one example of a device including a conversion mechanism of a movement direction using a link mechanism.

BACKGROUND OF THE INVENTION

Patent Document 1 (Japanese Patent No. 6631674) discloses a surface analyzer for analyzing a sample surface. Patent Document 1 discloses a moving mechanism in which a sample stage holding portion is raised or lowered so that a sample stage is moved upward and downward between a measurement position and a retracted position positioned lower than the measurement position and the sample stage holding portion is reciprocated in the backward and forward direction so that the sample stage is moved between the retracted position and the sample take-out position.

The moving mechanism described in Patent Document 1 is provided with a link mechanism including two blocks (a support provided below and a sample stage holding portion provided above) and a link member connecting the two blocks. The rearward movement of the sample stage holding portion is restricted when the rear surface of the sample stage holding portion comes into contact with the roller. In this state, by moving the support forward and backward, the inclination angle of the link member is changed. Thus, the raising and lowering of the sample stage holding portion is performed.

PRIOR ART DOCUMENT

Patent Document

Patent Document 1: Japanese Patent No. 6631674

SUMMARY OF THE INVENTION

Problems to be Solved by the Invention

In the moving mechanism described in Patent Document 1, when the inclination angle with respect to the horizontal direction of the link member (link mechanism) when the sample stage holding portion is brought into contact with the roller is small (e.g., less than 45 degrees), the component of the force acting on the link member in the rotational direction becomes relatively small. As a result, the driving force in the front-rear direction (horizontal direction) cannot necessarily be efficiently converted into the vertical direction, which may cause a case in which the link mechanism is not smoothly operated.

It is an object of the present disclosure to provide a conversion mechanism capable of smoothly converting a movement direction using a link mechanism, which can be applied to a surface analyzer or the like.

Means for Solving the Problem

A surface analyzer according to the present disclosure is a surface analyzer for analyzing a sample surface. The surface analyzer is provided with a measuring unit, a sample stage for placing a sample, and a moving mechanism for relatively displacing the measuring unit and the sample stage.

The moving mechanism is provided with a link mechanism including a first block, a second block for holding the sample stage, and a link member pivotally supported by the first block and the second block, a slide mechanism for reciprocating the first block in a first direction, and a contact member for guiding the lifting and lowering movement of the second block in a second direction by being brought into contact with the second block or the link member. The link member is pivotally supported by the first block and the second block so as to be rotatable about a rotation axis in a third direction perpendicular to the first direction and the second direction.

According to one aspect of the present disclosure, in the above-described surface analyzer, the surface of the contact member has an obliquely upward normal vector that intersects with the first direction at an angle greater than 0 degrees and less than 90 degrees at the first contact point where the second block or the link member initially comes into contact with the contact member when the first block is moved toward the contact member.

According to another aspect of the present disclosure, in the above-described surface analyzer, the contact member has a circular cross-section as viewed from the third direction. When the first block is moved towards the contact member, the second block or the link member initially comes into contact with the contact member at a first contact point positioned obliquely above the central axis of the circular cross-section.

In the above-described surface analyzer, when the second block or the link member initially comes into contact with the contact member, at the first contact point, the second block or the link member receives a reaction force obliquely upward from the contact member. This reaction force serves as a force for lifting or rotating the second block or the link member. Therefore, the movement direction can be smoothly converted by the link mechanism without excessively increasing the burden on the slide mechanism. From another point of view, it is possible to initiate the raising of the second block or the rotation of the link member from a condition in which the inclination of the link mechanism is relatively small. Therefore, the stroke of the movement in the second direction by the link mechanism can be increased.

Effects of the Invention

According to the present disclosure, it is possible to smoothly convert a movement direction using a link mechanism without excessively increasing the burden on the slide mechanism. According to another aspect, the stroke of the movement in the second direction by the link mechanism can be increased.

BRIEF DESCRIPTION OF THE DRAWINGS

FIG. 6 is a (first) diagram schematically showing a component force of a force acting on a link mechanism.

FIG. 7 is a (second) diagram schematically showing a component force of a force acting on a link mechanism.

FIG. 8 is a diagram showing a first condition of a moving mechanism according to one embodiment of the present disclosure.

EMBODIMENTS FOR CARRYING OUT THE INVENTION

Figure 1:
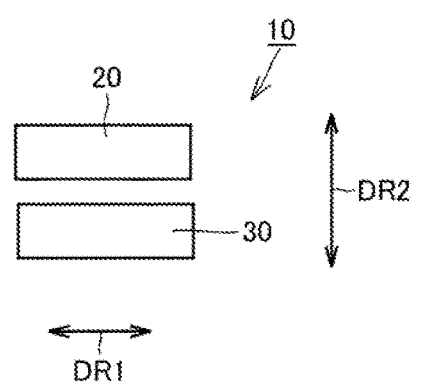
FIG. 1 is a schematic diagram showing a positional relation between a measuring unit and a sample stage at the time of measuring in a scanning probe microscope.

Hereinafter, some embodiments of the present disclosure will be described. The same or corresponding part is denoted by the same reference numeral, and the description thereof may not be repeated.

Note that in the embodiments described below, when referring to the number of pieces, the amount, or the like, the scope of the present disclosure is not necessarily limited to the number, the amount, or the like, unless otherwise specified. In addition, in the following embodiments, each component is not necessarily essential to the present disclosure unless otherwise specified.

Figure 2:
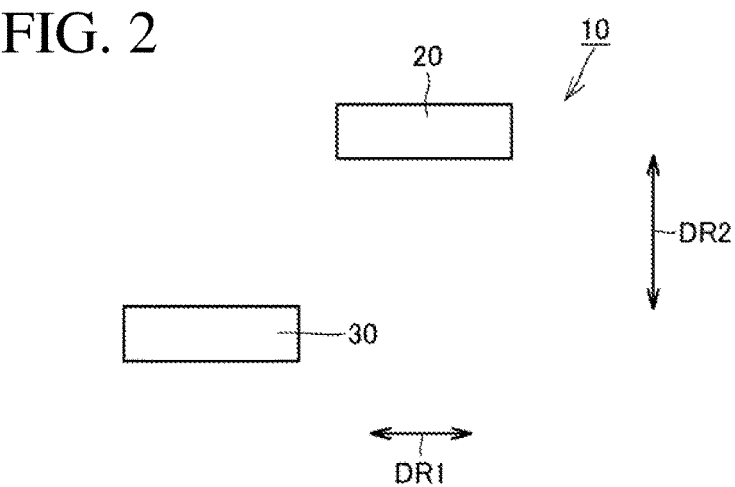
FIG. 2 is a schematic diagram showing a positional relation between a measuring unit and a sample stage at the time of taking out a sample in a scanning probe microscope.

FIG. 1 is a schematic diagram showing the positional relation between a measuring unit and a sample stage in a scanning probe microscope (SPM: Scanning Probe Microscope) as a "surface analyzer" according to the embodiment. FIG. 2 is a schematic diagram showing a positional relation between a measuring unit and a sample stage at the time of taking out a sample in the scanning probe microscope according to the embodiment. Referring to FIG. 1 and FIG. 2, the scanning probe microscope 10 will be described.

As shown in FIG. 1, the scanning probe microscope 10 is provided with a measuring unit 20 and a sample stage 30. The scanning probe microscope 10 is used by placing it on a horizontal surface. The scanning probe microscope 10 is a microscope for scanning a sample surface with a small probe to observe the three-dimensional shapes and local physical properties of the sample at a high magnification for the analysis purpose.

The measuring unit 20 measures the sample from above the sample placed on the sample stage 30 at a measurement position. The measuring unit 20 is provided with a cantilever (not shown). By detecting the warpage and/or the vibrations of the cantilever that scans the surface of the sample, it is possible to observe the shape and the surface physical properties of the sample.

The measuring unit 20 has a displacement-detecting system. The displacement-detecting system includes, for example, a laser diode that outputs a laser beam, an optical system, such as, e.g., a lens and a mirror, that guides the laser beam to the sample, a beam splitter, and a photodetector that receives the reflected light from the cantilever.

The sample stage 30 is a portion for placing a sample. The sample stage 30 is configured to be movable between a sample take-out position (first position) and a measurement position (second position). Consequently, the measuring unit 20 and the sample stage 30 are relatively displaced.

At the time of measurement, as shown in FIG. 1, the sample stage 30 is positioned at the measurement position. At this time, the sample stage 30 faces the measuring unit 20. When taking out the sample, the sample stage 30 is positioned at a sample take-out position as shown in FIG. 2. The sample take-out position is positioned below the measurement position and ahead (of the scanning probe microscope 10). When moving from the measurement position to the sample take-out position, the sample stage 30 is initially moved downward and then moved forward. Thus, when the sample stage 30 is moved forward, the sample stage 30 is sufficiently far downward from the measuring unit 20. Thus, the sample can be pulled out forward safely. In addition, even in a case where a petri dish is used for an in-liquid observation, the sample replacement can be performed without trouble. Furthermore, since the sample take-out position is positioned forward of the measurement position, the cantilever is not positioned above the sample when the sample is replaced. Thus, the workability of the sample replacement is improved.

Figure 3:
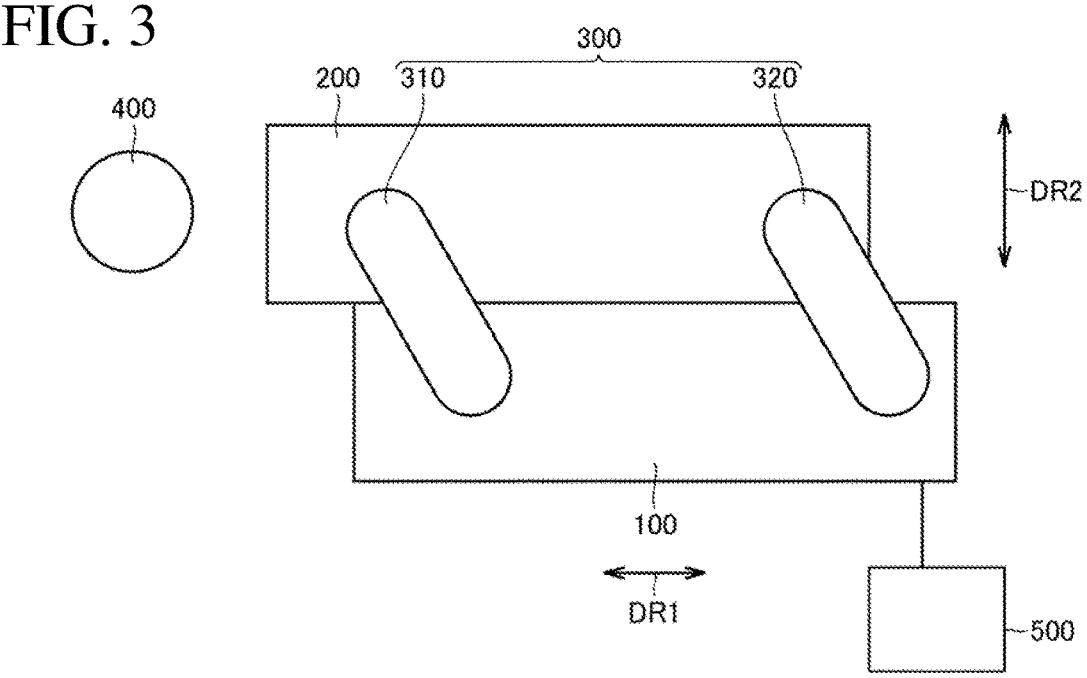
FIG. 3 is a (first) conceptual diagram of a moving mechanism for moving a sample stage between a sample take-out position and a measurement position.
Figure 4:
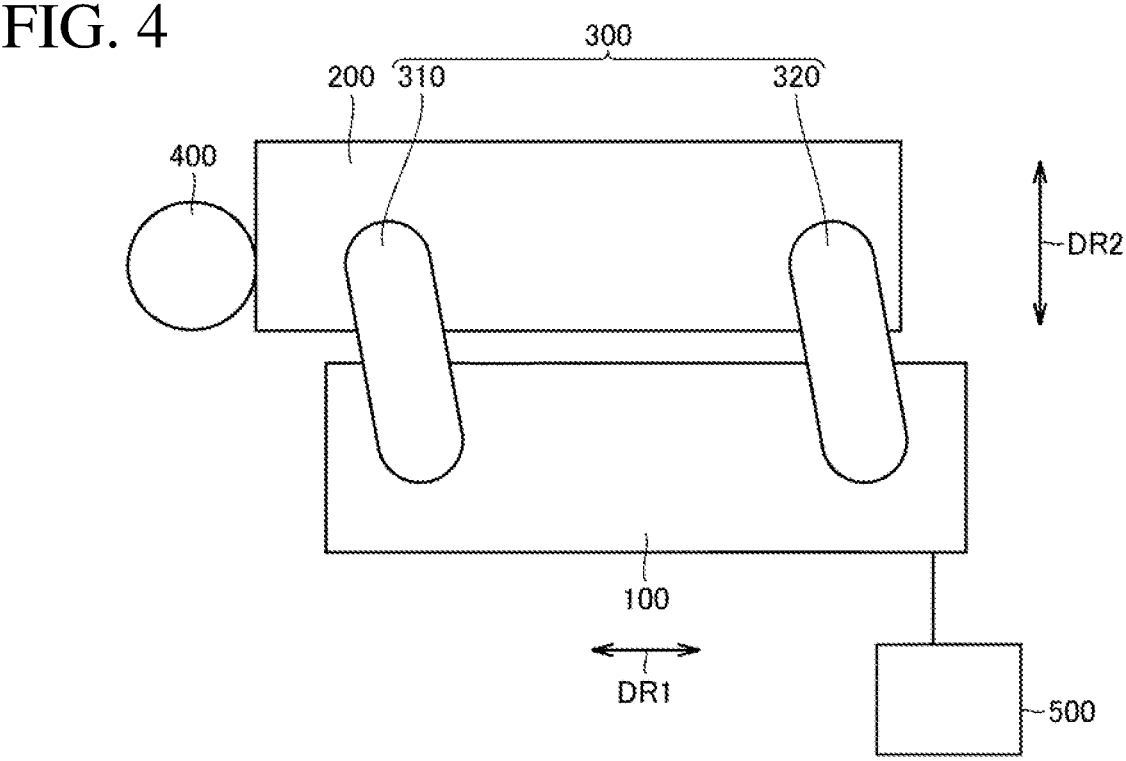
FIG. 4 is a (second) conceptual diagram of a moving mechanism for moving a sample stage between a sample take-out position and a measurement position.

To move the sample stage 30 between the sample take-out position and the measurement position, a moving mechanism for moving the sample stage 30 in the vertical direction (arrow DR2 direction) as well as moving the sample stage 30 in the front-rear direction (arrow DR1 direction) of the scanning probe microscope 10 are required. FIG. 3 and FIG. 4 are conceptual diagrams of a moving mechanism for moving a sample stage between a sample take-out position (first position) and a measurement position (second position).

As shown in FIG. 3 and FIG. 4, the moving mechanism includes a first block 100, a second block 200, a link member 300, a contact member 400, and a slide mechanism 500.

The first block 100 is provided on the lower side, and the second block 200 is provided on the upper side. The second block 200 holds the sample stage 30. The first block 100 and the second block 200 are connected by a plurality of link members 310 and 320. One end of each of the plurality of link members 300 (310, 320) is pivotally supported by the first block 100. The other end of each of the plurality of link members 300 (310, 320) is pivotally supported by the second block 200. The first block 100, the second block 200, and the link member 300 constitute a link mechanism.

The slide mechanism 500 causes the first block 100, the second block 200, and the link member 300 to reciprocate in the arrow DR1 direction (first direction). From the state shown in FIG. 3, when the link mechanism is moved to the left side (rearward side of the scanning probe microscope 10) in the figure, as shown in FIG. 4, the rear end portion of second block 200 comes into contact with the contact member 400. The movement of the second block 200 in contact with the contact member 400 in the arrow DR1 direction is restricted.

In the state in which the second block 200 is in contact with the contact member 400, when the first block 100 is further moved to the left in the figure, the second block 200 is raised along the arrow DR2 direction (second direction) while being guided by the contact member 400. That is, the contact member 400 comes into contact with the second block 200 and guides the lifting and lowering movement of the second block 200 in the vertical direction (arrow DR2 direction). At this time, the link member 300 rotates about the rotation axis in a direction perpendicular to the surface of the paper (in the third direction).

The second block 200 is moved from the state in which the sample stage 30 is at the sample take-out position (first position) to the rear side of the scanning probe microscope 10, and then is guided by the contact member 400 and moved upward. As a result, the sample stage 30 held by the second block 200 reaches a measurement position (second position) facing the measuring unit 20. When moving the sample stage 30 from the measurement position (second position) to the sample take-out position (first position), the link mechanism is operated in a direction opposite to the above.

In the example of this embodiment, the contact member 400 is constituted by a circular roller rotatable about a rotational axis parallel to the rotation axis of the link member 300, but the shape of the contact member 400 is not limited to a circular shape. Further, the contact member 400 is not limited to a rotatable roller as long as it can guide the movement of the second block 200 in the arrow DR2 direction.

The slide mechanism 500 includes a motor which, due to the driving force of the motor, reciprocates the first block 100 (support) along the arrow DR1 direction (the front-rear direction of the scanning probe microscope 10).

Figure 5:
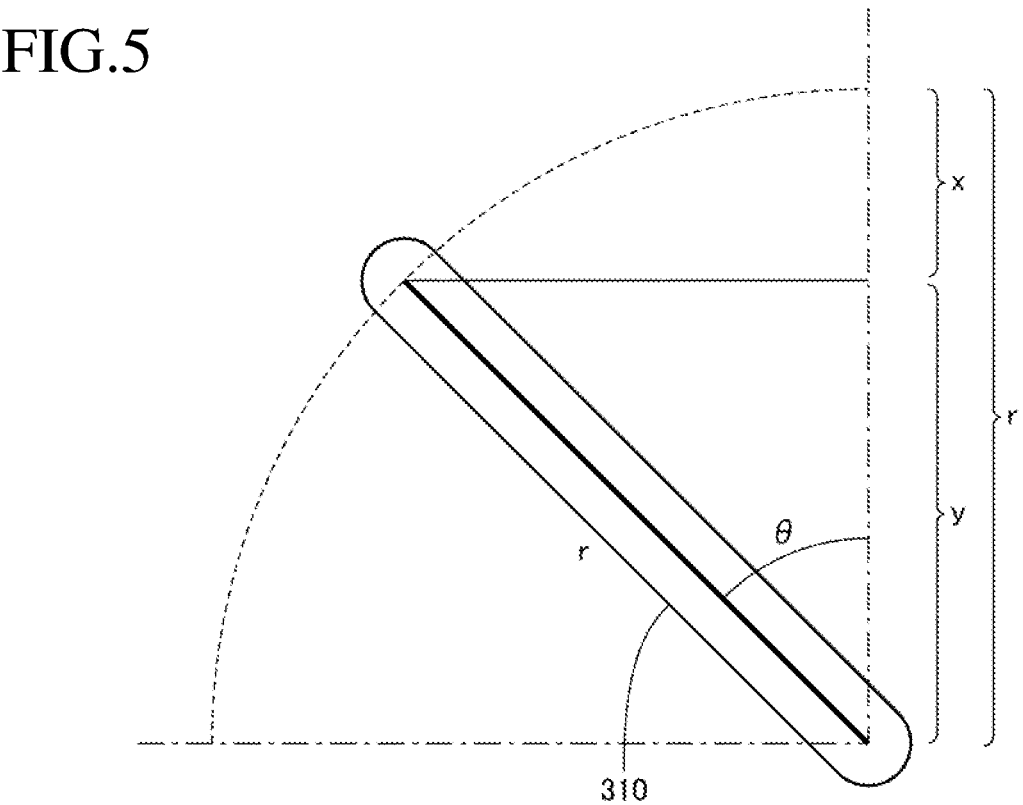
FIG. 5 is a diagram schematically showing a relation between a perpendicular displacement, a rotational radius, and a rotational angle of a link mechanism.

FIG. 5 is a diagram schematically showing the relation between the perpendicular displacement of the link mechanism, the rotational radius, and the rotational angle.

As shown in FIG. 5, when the length of the link member 310 is "r" and the angle formed between the link member 310 and the vertical direction (arrow DR2 direction) is "θ", the maximum stroke "x" in the vertical direction by the link mechanism can be obtained by the following formula.

$$x = r - y = r - r \cos \theta = r \cdot (1 - \cos \theta)$$

Therefore, if it is desired to increase the vertical movement amount by the link mechanism (i.e., the vertical movement stroke of the sample stage 30 held by the second block 200), it is required to increase the "r" or the "θ" in FIG. 5. When "r" in FIG. 5 is increased, the link mechanism becomes larger.

FIG. 6 and FIG. 7 are diagrams schematically showing the component force of the force acting on the link mechanism. FIG. 7 shows a condition in which the angle "θ" formed between the link member 310 and the vertical direction (the arrow DR2 direction) is larger than that in FIG. 6.

When the second block 200 comes into contact with the contact member 400, the second block 200 receives a reaction force from the contact member 400. The horizontal components of the reaction force from the contact member 400 is transmitted to the link member 310 as an external force F, as shown in FIG. 6 and FIG. 7. The external force F transmitted to the link member 310 is decomposed into the axial component F1 of the link member 310 and the rotational direction component F2 of the link member 310. The rotational direction component F2 is a force that rotates the link member 310 to lift the second block 200.

In the example of FIG. 7, as compared with the example of FIG. 6, the angle formed between the link member 310 and the vertical direction is large. Therefore, in the example of FIG. 7, it is possible to obtain a relatively large vertical stroke of the link mechanism. On the other hand, in the example of FIG. 7, as compared with the example of FIG. 6, the rotational direction component F2 of the external force F acting on the link member 310 is relatively small. When the link mechanism is moved and the second block 200 comes into contact with the contact member 400 in the state shown in FIG. 7, the force to lift the second block 200 is not enough, and therefore the movement direction transformation by the link mechanism may not be performed smoothly.

In order to increase the lifting force of the second block 200, it is conceivable to increase the external force F. Increasing the external force F increases the load on the motor of the slide mechanism 500.

Figure 9:
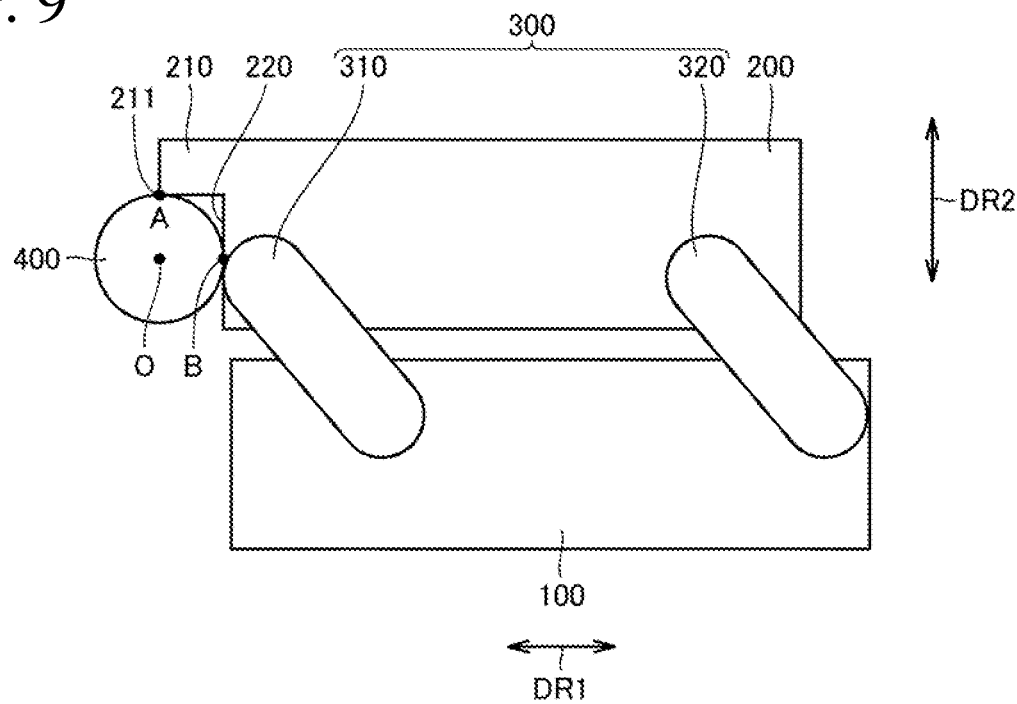
FIG. 9 is a diagram showing a second condition of the moving mechanism shown in FIG. 8.
Figure 10:
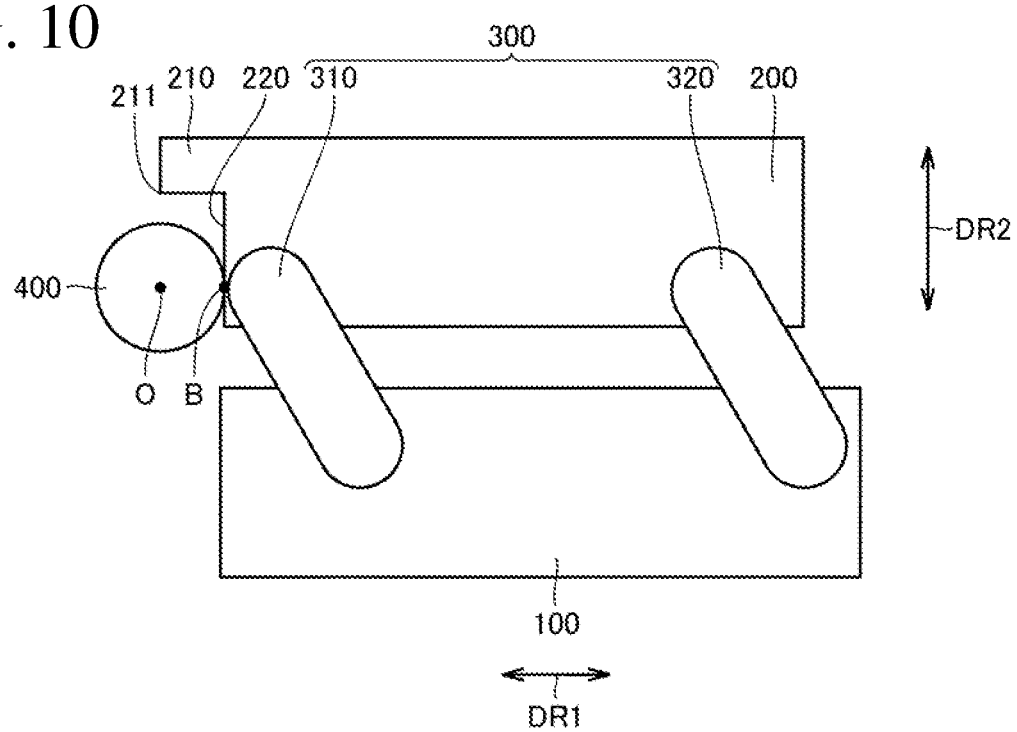
FIG. 10 is a diagram showing a third condition of the moving mechanism shown in FIG. 8.

The moving mechanism according to this embodiment can solve these problems. This moving mechanism will be described in more detail. FIG. 8 shows a state (first state) before the second block 200 comes into contact with the contact member 400. FIG. 9 shows a state (second state) in which the second block 200 is lifted obliquely upward after coming into contact with the contact member 400. FIG. 10 shows a state (third state) in which the second block 200 is lifted vertically from the state of FIG. 9.

As shown in FIG. 8 to FIG. 10, the upper portion of the end portion of the second block 200 on the side of the contact member 400 is provided with a protruding portion 210 protruding toward the contact member 400.

From the state shown in FIG. 8, when the first block 100 is moved toward the side (left side in the figure) of the contact member 400, the protruding portion 210 of the second block 200 initially comes into contact with the contact member 400. More specifically, the contact point 211 positioned at the lower corner of the protruding portion 210 initially comes into contact with the contact point A (first contact point) of the contact member 400. The contact point A of the contact member 400 is positioned obliquely above the central axis O of the circular cross-section of the contact member 400. Note that chamfering or R processing may be performed on the lower corner of the protruding portion 210 so that the contact point 211 may be positioned on the chamfered portion or R processed portion.

After the contact point 211 of the second block 200 comes into contact with the the contact point A of the contact member 400, the first block 100 is further driven toward the left side in the figure. As a result, the second block 200 is raised while being guided by the contact member 400, and as shown in FIG. 9, in addition to the contact point 211, the vertical surface 220 positioned below the protruding portion 210 comes into contact with the contact member 400. The vertical surface 220 comes into contact with the contact point B (second contact point) positioned on a horizontal surface containing the central axis O of the circular cross-section of the contact member 400.

From the state shown in FIG. 9, the first block 100 is further driven to the left in the figure. Thus, the second block 200 is further raised while being guided by the contact member 400 with the vertical surface 220 in contact with the contact point B. When the second block 200 is raised to the position shown in FIG. 10, the sample stage 30 reaches the measurement position facing the measuring unit 20.

Figure 11:
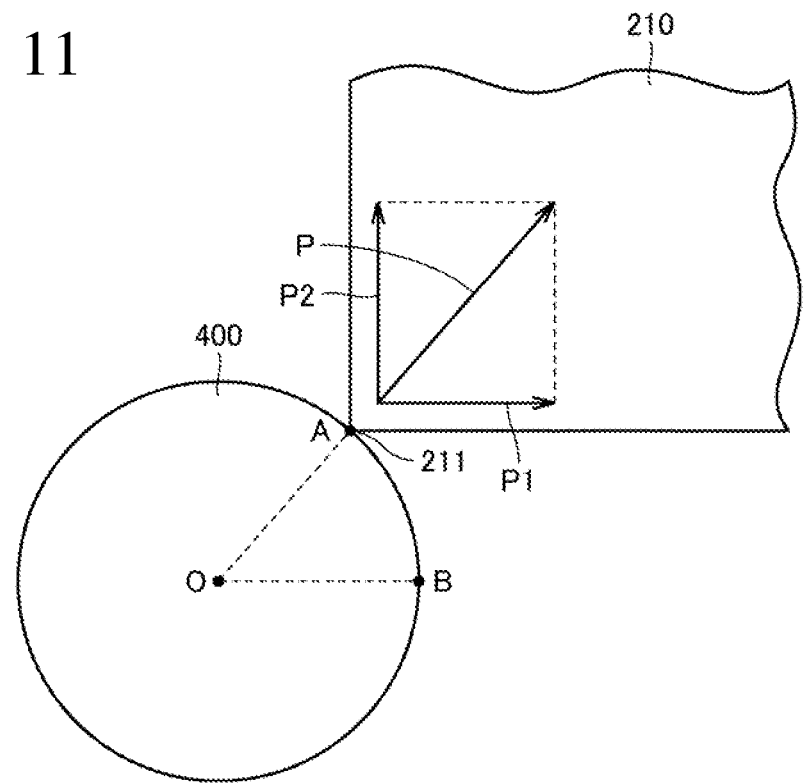
FIG. 11 is a (first) diagram showing a direction of a force that a link mechanism receives from a contact member in the moving mechanism shown in FIG. 8 to FIG. 10.
Figure 12:
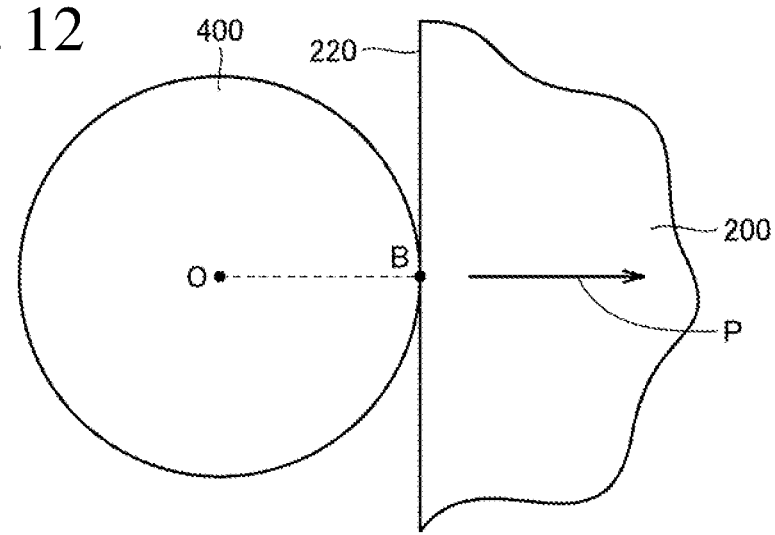
FIG. 12 is a (second) diagram showing a direction of a force that a link mechanism receives from a contact member in the moving mechanism shown in FIG. 8 to FIG. 10.

FIG. 11 and FIG. 12 are diagrams showing the direction of the force received by the link mechanism from the contact member 400 in the moving mechanism shown in FIG. 8 to FIG. 10. FIG. 11 shows a state when the contact point 211 of the second block 200 is initially brought into contact with the contact member 400. FIG. 12 shows a state when the second block 200 is raised and the vertical surface 220 is brought into contact with the contact member 400.

As shown in FIG. 11 and FIG. 12, the second block 200 will receive a reaction force P in a direction of a normal vector of the surface of the contact member 400 at the contact point ("A" in FIG. 11, "B" in FIG. 12).

As shown in FIG. 11, when the second block 200 is initially brought into contact with the contact member 400, the surface of the contact member 400 has an obliquely upward normal vector at the contact point A. Thus, the second block 200 receives an obliquely upward reaction P. The reaction force P is decomposed into a horizontal component P1 and a vertical component P2. The vertical component P2 is a force that lifts the second block 200 upward, and the second block 200 can also start to rise by receiving the upward force from the contact member 400 in addition to the link member 300. Therefore, it is possible to smoothly convert the movement direction by the link mechanism without excessively increasing the load of the motor of the slide mechanism 500. According to another aspect, the raising of the second block 200 can be initiated from a condition in which the inclination of the link member 300 is relatively close to horizontal (a condition in which θ in FIG. 5 is relatively large). Thus, the stroke of the vertical movement by the link mechanism can be increased.

As shown in FIG. 12, the second block 200 receives a horizontal reaction P when the vertical surface 220 of the second block 200 is in contact with the contact member 400 because at the contact point B the surface of the contact member 400 has a horizontal normal vector. At this time, although the second block 200 does not receive an upward force from the contact member 400, the second block 200 can be smoothly raised only by the force from the link member 300 because the inclination of the link member 300 is already relatively large (θ in FIG. 5 is relatively small).

From the viewpoint of increasing the upward force when the second block 200 is initially brought into contact with the contact member 400, it is desirable that the normal vector at the contact point A be inclined obliquely upward by 45 degrees or more with respect to the horizontal direction. However, the inclination angle of the normal vector is not limited thereto, and can be appropriately changed as long as the angle is greater than 0 degrees and less than 90 degrees.

In the examples of FIG. 8 to FIG. 12, it is configured such that the vertical surface 220 is provided below the protruding portion 210, and the contact member 400 comes into contact with the vertical surface 220 when the sample stage 30 reaches the measurement position facing the measuring unit 20. Therefore, when the sample stage 30 has approached the measuring unit 20, the sample stage 30 can be raised and lowered along the vertical direction (vertical direction perpendicular to the horizontal surface) rather than the oblique direction. Thus, the flexibility of the arrangement of the components in the inner space of the housing of the scanning probe microscope 10 (in particular, the arrangement near the measuring unit 20) is improved.

Next, a modification of the moving mechanism according to this embodiment will be described with reference to FIG. 13 to FIG. 18.

Figure 13:
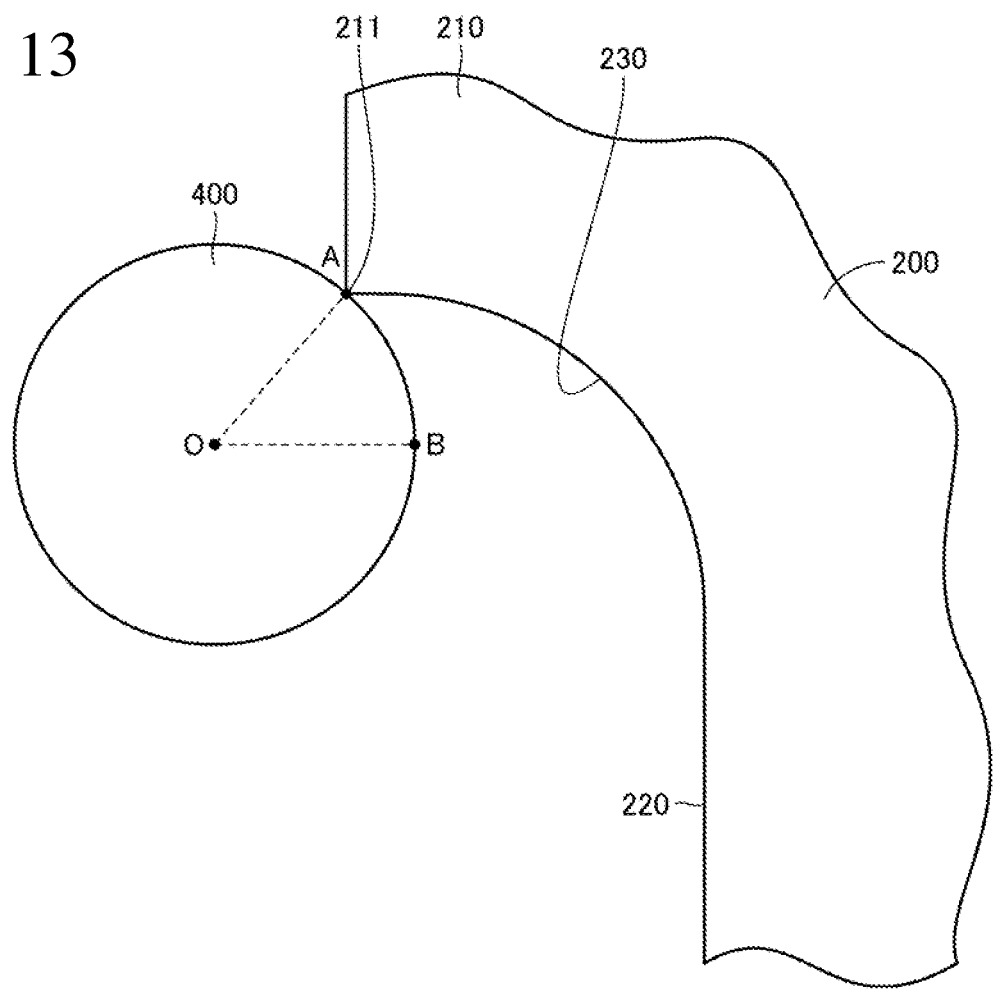
FIG. 13 is a diagram showing a (first) modification of a moving mechanism according to one embodiment of the present disclosure.

In the example of FIG. 13, a circular arc surface 230 (curved surface) is provided between the contact point 211 and the vertical surface 220 of the protruding portion 210. The circular arc surface 230 is formed so as to be continuous to the lower portion of the protruding portion 210 and has a curvature radius greater than the radius of the circular contact member 400.

By providing a larger curvature radius of the circular arc surface 230 than that of the contact member 400 between the protruding portion 210 and the vertical surface 220, the second block 200 can be continuously raised without separating from the contact member 400 after the contact point 211 initially comes into contact with the contact point A. Thus, it is possible to continuously raise the second block 200 more smoothly.

Figure 14:
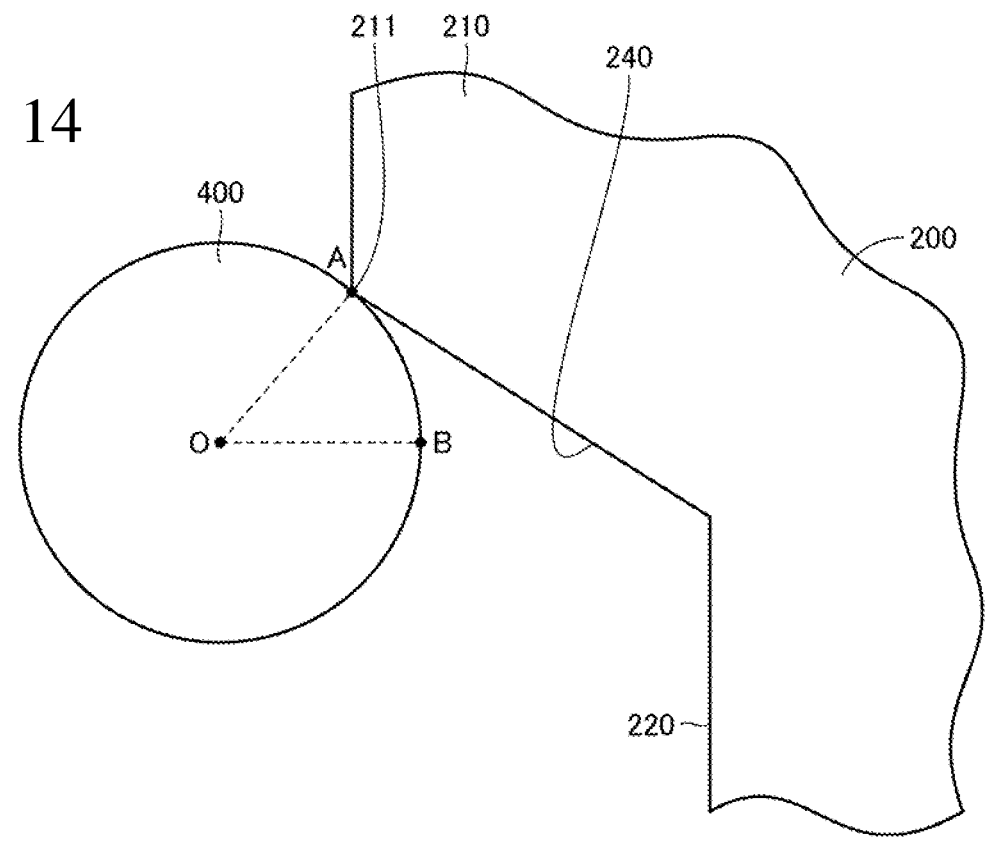
FIG. 14 is a diagram showing a (second) modification of a moving mechanism according to one embodiment of the present disclosure.

In the example of the embodiment of FIG. 14, an inclined surface 240 (flat surface) is provided in place of the circular arc surface 230. Also in the example of FIG. 14, similarly to the example of FIG. 13, the second block 200 can be continuously raised without being separated from the contact member 400.

Figure 15:
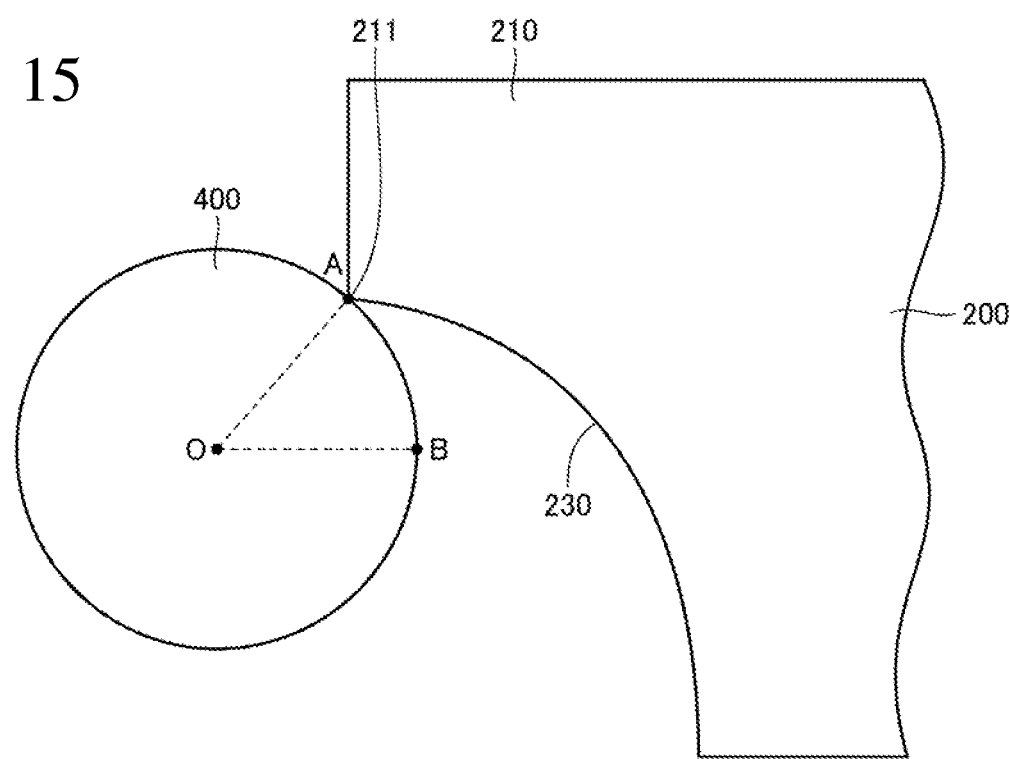
FIG. 15 is a diagram showing a (third) modification of a moving mechanism according to one embodiment of the present disclosure.
Figure 16:
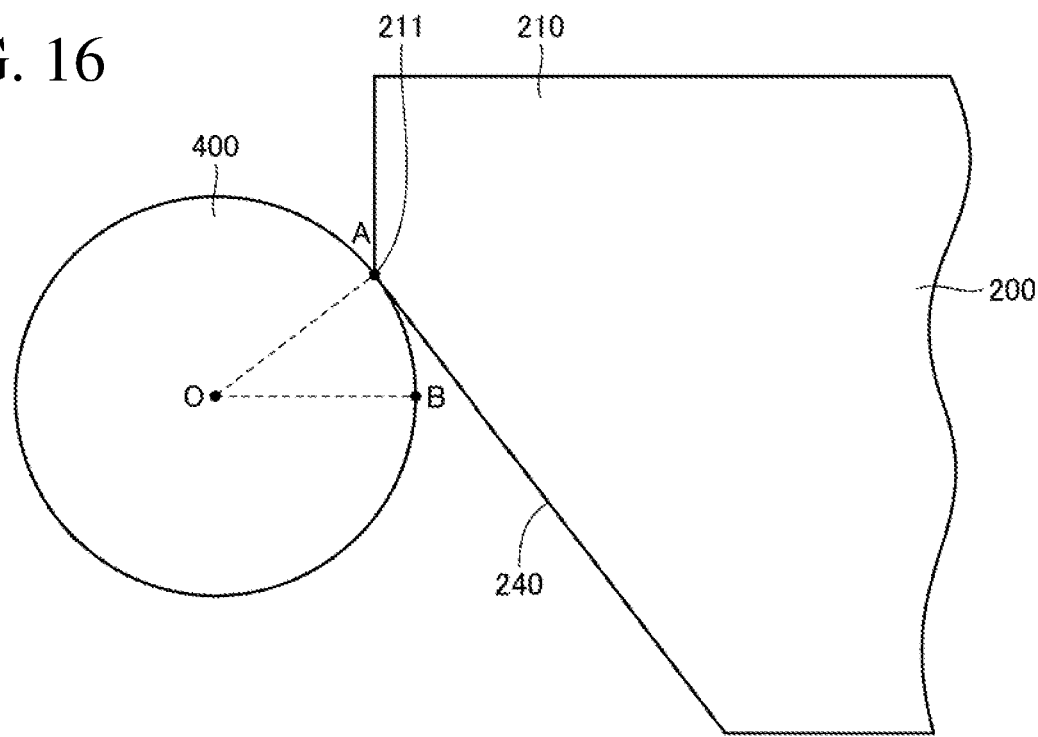
FIG. 16 is a diagram showing a (fourth) modification of a moving mechanism according to one embodiment of the present disclosure.

In the examples of FIG. 15 and FIG. 16, the vertical surface 220 is not provided below the protruding portion 210, and only the circular arc surface 230 (FIG. 15) and the inclined surface 240 (FIG. 16) are provided.

Figure 17:
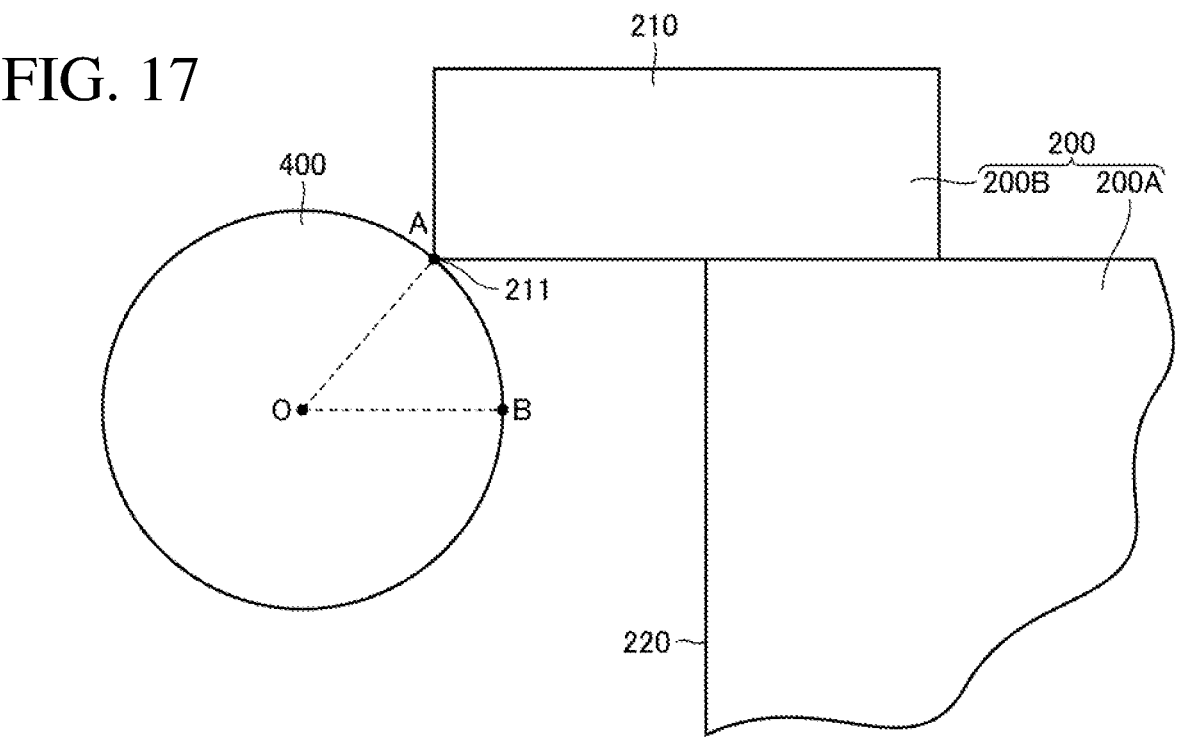
FIG. 17 is a diagram showing a (fifth) modification of a moving mechanism according to one embodiment of the present disclosure.

In the example of FIG. 17, the second block 200 is composed of a first member 200A and a second member 200B, and a protruding portion 210 is configured by the second member 200B.

Figure 18:
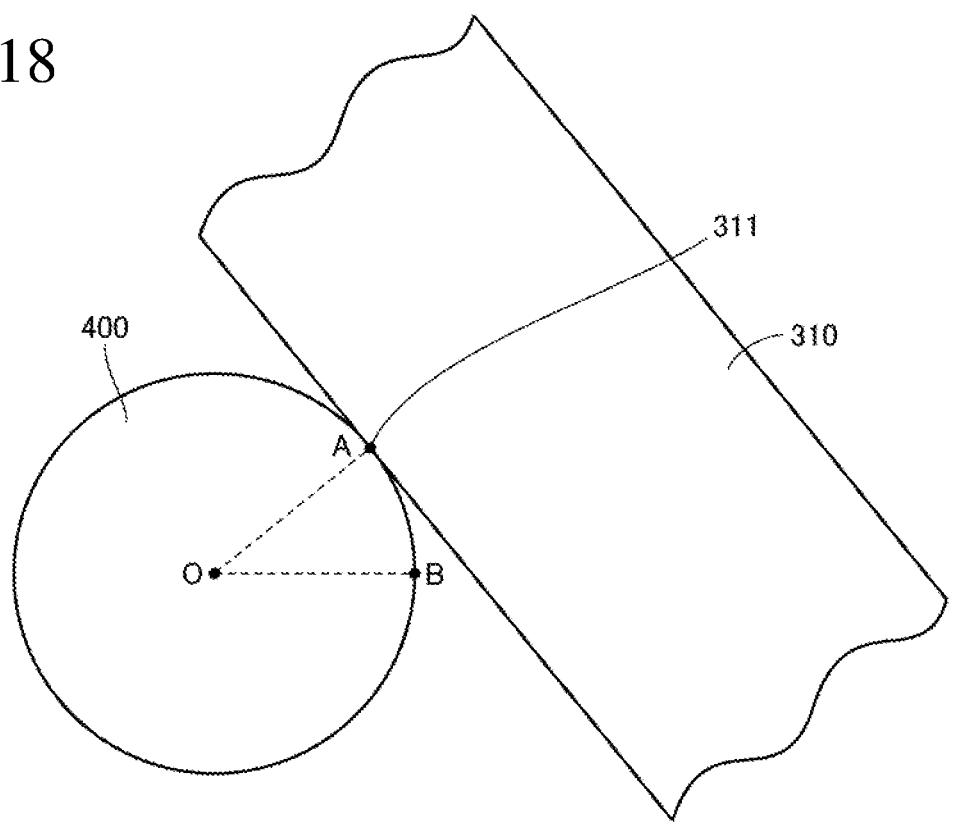
FIG. 18 is a diagram illustrating a (sixth) modification of a moving mechanism according to one embodiment of the present disclosure.

In the above-described embodiments, examples have been described in which the second block 200 initially comes into contact with the contact member 400. However, as shown in FIG. 18, instead of the second block 200, the contact point 311 of the link member 310 may come into contact with the contact member 400. Further, by processing the side surface of the link member, a contact surface of any desired shaped may be formed.

Further, in the embodiments, a scanning probe microscope 10 (surface analyzer) has been described as an example of a device to which the above-described moving mechanism including the link mechanism is applied, but the moving mechanism according to this disclosure is not limited to the mechanism to be applied to a surface analyzer. The scope of the present disclosure also extends to a moving mechanism having the same configuration as described above, which is included in, for example, a gate valve or the like used in a vacuum device or the like.

[Note]

As discussed above, the present embodiments include the following disclosures.

[Configuration 1]

A surface analyzer for analyzing a sample surface, comprising:
  a measuring unit;
  a sample stage configured to place a sample thereon; and
  a moving mechanism configured to relatively displace the measuring unit and the sample stage,
  wherein the moving mechanism includes
  a link mechanism including a first block, a second block configured to hold the sample stage, and a link member pivotally supporting the first block and the second block,
  a slide mechanism configured to reciprocate the first block in a first direction, and a contact member configured to guide a lifting and lowering movement of the second block in a second direction by being brought into contact with the second block or the link member, wherein the link member is pivotally supported by the first block and the second block so as to be pivotable about a rotation axis about a third direction perpendicular to the first direction and the second direction, and wherein at a first contact point where the second block or the link member initially comes into contact with the contact member when the first block is moved toward the contact member, a surface of the contact member has an obliquely upward normal vector that intersects with the first direction at an angle greater than 0 degree and less than 90 degrees.

In the above-described surface analyzer, when the second block or the link member initially comes into contact with the contact member, at the first contact point, the second block or the link member receives a reaction force obliquely upward from the contact member. This reaction force serves as a force for lifting or rotating the second block or the link member. Therefore, the movement direction can be smoothly converted by the link mechanism without excessively increasing the burden on the slide mechanism. From another point of view, it is possible to initiate the raising of the second block or the rotation of the link member from a condition where the inclination of the link mechanism is relatively small, so that the stroke of the movement in the second direction by the second block can be increased.

[Configuration 2]

The surface analyzer as recited in the above-described configuration 1, wherein the normal vector intersects with the first direction at an angle equal to or greater than 45 degrees and less than 90 degrees.

According to the above-mentioned configuration 2, the movement direction can be more smoothly converted by the link mechanism with respect to the configuration 1.

[Configuration 3]

A surface analyzer for analyzing a sample surface, comprising:

a measuring unit;

a sample stage configured to place a sample thereon; and a moving mechanism configured to relatively displace the measuring unit and the sample stage, wherein the moving mechanism includes a link mechanism including a first block, a second block configured to hold the sample stage, and a link member pivotally supporting the first block and the second block, a slide mechanism configured to reciprocate the first block in a first direction, and a contact member configured to guide a lifting and lowering movement of the second block in a second direction by being brought into contact with the second block or the link member, wherein the link member is pivotally supported by the first block and the second block so as to be pivotable about a rotation axis of a third direction perpendicular to the first direction and the second direction, wherein the contact member has a circular cross-section as viewed from the third direction, and wherein the second block or the link member initially comes into contact with the contact member at a first contact point positioned obliquely above a central axis of the circular cross-section when the first block is moved toward the contact member.

Also with the above-described configuration 3, similarly to the configuration 1, it is possible to smoothly convert the movement direction by the link mechanism without excessively increasing the burden on the slide mechanism. From another point of view, it is possible to initiate the rotation of the link member without raising the second block from a condition in which the inclination of the link mechanism is relatively small, so that the stroke of the movement in the second direction by the second block can be increased.

[Configuration 4]

The surface analyzer as recited in the above-described configuration 3, wherein the first contact point is at a position apart with respect to the first direction by an angle equal to or larger than 45 degrees and less than 90 degrees in a circumferential direction of the circular cross-section.

According to the above-described configuration 4, the movement direction can be more smoothly converted by the link mechanism with respect to the configuration 3.

[Configuration 5]

The surface analyzer as recited in any one of the above-described configurations 1 to 4, wherein the second block has an end portion positioned on a contact member side, wherein a part of the end portion is provided with a protruding portion protruding toward the contact member, and wherein the protruding portion of the second block initially comes into contact with the contact member when the first block is moved toward the contact member.

According to the above-described configuration 5, the second block receives the diagonally upward reaction force from the contact member by bringing the first contacting protruding portion of the second block into contact with the contact member, it is possible to smoothly convert the movement direction by the link mechanism.

[Configuration 6]

The surface analyzer as recited in the above-described configuration 5, wherein an end surface of the second block on a side of the contact member includes a curved surface continuously extending downward of the protruding portion, and wherein the curved surface includes a circular arc surface having a curvature radius greater than a curvature radius of the contact member that is brought into contact with the curved surface.

According to the above-described configuration 6, since the second block can be continuously raised without being separated from the contact member after the second block initially comes into contact with the first contact point, the second block can be raised more smoothly.

[Configuration 7]

The surface analyzer as recited in the above-described configuration 5 or 6, wherein an end surface of the second block on a side of the contact member includes a flat surface positioned below the protruding portion and extending in the second direction, and wherein when the sample stage is in a position facing the measuring unit, the contact member is in contact with the flat surface.

According to the above-described configuration 7, when the sample stage has approached the measuring unit, it is possible to raise and lower the sample stage along the vertical direction rather than in the oblique direction. Thus, the flexibility of the arrangement of the components in the inner space of the housing of the surface analyzer (in particular, the arrangement near the measuring unit) is improved.

[Configuration 8]

The surface analyzer as recited in any one of the configurations 1 to 7,
wherein the contact member includes a roller rotatable about a rotational axis parallel to the rotation axis of the link member in the third direction.

According to the above-described configuration 8, the roller can be rotated, and the second block can be guided by utilizing the frictional force between the roller surface and the surface of the second block or the link member for the lifting and lowering movement.

Although embodiments of the present disclosure have been described above, it should be understood that the presently disclosed embodiments are illustrative and not restrictive in all respects. The scope of the present disclosure is indicated by the claims, and it is intended to include all modifications within the meaning and range equivalent to the claims.

DESCRIPTION OF SYMBOLS

10: Scanning probe microscope
20: Measuring unit
30: Sample stage
100: First block
200: Second block
200A: First member
200B: Second member
210: Protruding portion
211, 311: Contact point
220: Vertical surface
230: Circular arc surface
240: Inclined surface
300,310,320: Link member
400: Contact member
500: Slide mechanism

The invention claimed is:

1. A surface analyzer for analyzing a sample surface, comprising:
a measuring unit;
a sample stage configured to place a sample thereon; and
a moving mechanism configured to relatively displace the measuring unit and the sample stage,
wherein the moving mechanism includes
a link mechanism including a first block, a second block configured to hold the sample stage, and a link member pivotally supporting the first block and the second block,
a slide mechanism configured to reciprocate the first block in a first direction, and
a contact member configured to guide a lifting and lowering movement of the second block in a second direction by being brought into contact with the second block or the link member,
wherein the link member is pivotally supported by the first block and the second block so as to be pivotable about a rotation axis about a third direction perpendicular to the first direction and the second direction, and
wherein at a first contact point where the second block or the link member initially comes into contact with the contact member when the first block is moved toward the contact member, a surface of the contact member has an obliquely upward normal vector that intersects with the first direction at an angle greater than 0 degree and less than 90 degrees.

2. The surface analyzer as recited in claim 1,
wherein the normal vector intersects with the first direction at an angle equal to or greater than 45 degrees and less than 90 degrees.

3. The surface analyzer as recited in claim 1,
wherein the second block has an end portion positioned on a contact member side,
wherein a part of the end portion is provided with a protruding portion protruding toward the contact member, and
wherein the protruding portion of the second block initially comes into contact with the contact member when the first block is moved toward the contact member.

4. The surface analyzer as recited in claim 3,
wherein an end surface of the second block on a side of the contact member includes a curved surface continuously extending downward of the protruding portion, and
wherein the curved surface includes a circular arc surface having a curvature radius greater than a curvature radius of the contact member that is brought into contact with the curved surface.

5. The surface analyzer as recited in claim 3,
wherein an end surface of the second block on a side of the contact member includes a flat surface positioned below the protruding portion and extending in the second direction, and
wherein when the sample stage is in a position facing the measuring unit, the contact member is in contact with the flat surface.

6. The surface analyzer as recited in claim 1,
wherein the contact member includes a roller rotatable about a rotational axis parallel to the rotation axis of the link member in the third direction.

7. A surface analyzer for analyzing a sample surface, comprising:
a measuring unit;
a sample stage configured to place a sample thereon; and
a moving mechanism configured to relatively displace the measuring unit and the sample stage,
wherein the moving mechanism includes
a link mechanism including a first block, a second block configured to hold the sample stage, and a link member pivotally supporting the first block and the second block,
a slide mechanism configured to reciprocate the first block in a first direction, and
a contact member configured to guide a lifting and lowering movement of the second block in a second direction by being brought into contact with the second block or the link member,
wherein the link member is pivotally supported by the first block and the second block so as to be pivotable about a rotation axis of a third direction perpendicular to the first direction and the second direction,
wherein the contact member has a circular cross-section as viewed from the third direction, and
wherein the second block or the link member initially comes into contact with the contact member at a first contact point positioned obliquely above a central axis of the circular cross-section when the first block is moved toward the contact member.

8. The surface analyzer as recited in claim 7,
wherein the first contact point is at a position apart with respect to the first direction by an angle equal to or larger than 45 degrees and less than 90 degrees in a circumferential direction of the circular cross-section.

9. The surface analyzer as recited in claim 7,
wherein the second block has an end portion positioned on a contact member side,
wherein a part of the end portion is provided with a protruding portion protruding toward the contact member, and
wherein the protruding portion of the second block initially comes into contact with the contact member when the first block is moved toward the contact member.

10. The surface analyzer as recited in claim 9,
wherein an end surface of the second block on a side of the contact member includes a curved surface continuously extending downward of the protruding portion, and
wherein the curved surface includes a circular arc surface having a curvature radius greater than a curvature radius of the contact member that is brought into contact with the curved surface.

11. The surface analyzer as recited in claim 9,
wherein an end surface of the second block on a side of the contact member includes a flat surface positioned below the protruding portion and extending in the second direction, and
wherein when the sample stage is in a position facing the measuring unit, the contact member is in contact with the flat surface.

12. The surface analyzer as recited in claim 7,
wherein the contact member includes a roller rotatable about a rotational axis parallel to the rotation axis of the link member in the third direction.

* * * * *